United States Patent Office 3,414,602
Patented Dec. 3, 1968

3,414,602
ZEOLITE N AND PROCESS FOR PREPARING SAME
Nancy A. Acara, Kenmore, N.Y., assignor to Union
Carbide Corporation, a corporation of New York
No Drawing. Filed July 1, 1965, Ser. No. 468,910
4 Claims. (Cl. 260—448)

ABSTRACT OF THE DISCLOSURE

A novel crystalline zeolitic molecular sieve having the composition expressed in terms of mole ratios of oxides $$0.83 \pm 0.05 Na_2O : 0.03 \pm .01[(CH_3)_4N]_2O : Al_2O_3 : 2.0 \pm 0.2 SiO_2 : yH_2O$$

is prepared from conventional silicon and aluminum sources, caustic and tetramethylammonium hydroxide.

---

The present invention relates in general to novel adsorbent of the molecular sieve type, and more particularly to novel synthetic crystalline tetramethylammonium-containing zeolites and to the process for their preparation.

The so-called framework aluminosilicates include feldspars, felspathoids and zeolites, all of which have structures consisting of three dimensional arrangements of $SiO_4$ and $AlO_4$ tetrahedra. The crystal structure of many zeolites also exhibit interstices of molecular dimensions occupied by water of hydration. Under proper conditions of dehydration, these zeolites may be utilized as efficient adsorbents whereby adsorbate molecules are retained within the interstitial spaces. Access to these channels is had by way of orifices in the crystal lattice. The openings limit the size and shape of the molcules that can be adsorbed. A separation of mixtures of foreign molecules based upon molecular dimensions, wherein certain molecules are absorbed by the zeolite while others are refused, is therefore possible. It is this characteristic property of many crystalline zeolites that has led to their designation as "molecular sieves." In addition to molecular size and shape, however, other factors may also influence the selective adsorption of certain foreign molecules by molecular sieves. Among these factors are: the polarizability and polarity of the adsorbate molecules; the degree of unsaturation of organic adsorbates; the size and polarizing power of the interstitial cation; the presence of adsorbate molecules in the interstitial spaces; and the degree of hydration of the zeolite.

Over the past few years about 30 species of synthetic crystalline zeolites have been prepared. They are distinguishable from each other and from the naturally occurring zeolites on the basis for their composition, crystal structure and adsorption properties. A suitable method for distinguishing these compounds, for example, is by their X-ray powder diffraction patterns. The existence of a number of zeolites having similar but distinguishable properties advantageously permits the selection of a particular member having optimum properties for a particular use.

The present invention has as its prime object the provision of a novel synthetic crystalline zeolite of the molecular sieve type. Another object is to provide a novel synthetic crystalline zeolite having useful adsorption properties. A further object is to provide convenient and efficient processes for preparing the novel zeolites of the invention.

Since there is no systematic method for the chemical naming of complex aluminosilicates, it has been the general policy utilized by all workers in the zeolite area to use an identification system primarily of capital letters. Accordingly the class of synthetic zeolitic molecular sieve compositions of the present invention are hereinafter designated zeolite N.

The composition of zeolite N can stoichiometrically be expressed in terms of moles of oxides, as follows:

$$0.83 \pm 0.05 Na_2O : 0.03 \pm 0.01[(CH_3)_4N]_2O : Al_2O_3 : 2.0 \pm 0.2 SiO_2 : yH_2O$$

wherein $y$ is any value of from zero to about 3. Minor variations in the molar values of these oxides within the ranges indicated by the above formula do not significantly change the crystal structure or properties of the zeolite.

In addition to composition and in conjunction therewith, zeolite N can be identified and distinguished from other crystalline substances by its X-ray powder diffraction pattern, the data for which are set forth below in Table A. In obtaining the X-ray powder diffraction pattern, standard techniques were employed. The radiation was the $K\alpha$ doublet of copper, and a Geiger counter spectrometer with a strip chart pen recorder was used. The peak heights I, and the positions as a function of $2\theta$, where $\theta$ is the Bragg angle, were read from the spectrometer chart. From these, the relative intensities 100 $I/I_{max}$ where $I_{max}$ is the intensity of the strongest line or peak, and $d(A.)$ observed, the interplanar spacing in angstrom units corresponding to the recorded lines, were determined. In Table A, the more significant interplanar spacings, i.e., $d(A.)$ values, for zeolite N are given; the relative intensities of the lines are expressed as VS (very strong), S (strong), M (medium) and W (weak).

TABLE A

| Interplanar spacing $d(A)$: | Relative intensity |
|---|---|
| 21.4±0.4 | W |
| 12.8±0.2 | M |
| 11.1±0.2 | S |
| 9.2±0.2 | M |
| 6.51±0.1 | VS |
| 4.04±0.08 | S |
| 3.75±0.07 | M |
| 3.12±0.05 | W |
| 2.99±0.05 | M |
| 2.75±0.05 | M |

Thus zeolite N can be defined as a synthetic crystalline aluminosilicate having an X-ray powder diffraction pattern characterized by at least those interplanar spacing values set forth in Table A and having the stoichiometric compositions as set forth hereinbefore. The X-ray data given below in Table B are for a typical example of zeolite N as prepared in Example 2, infra.

TABLE B

| Interplanar spacing, $d(A.)$: | Relative line intensity, $I/I_{max} \times 100$ |
|---|---|
| 21.655 | 41 |
| 13.173 | 68 |
| 11.191 | 73 |
| 9.299 | 50 |
| 7.138 | 14 |
| 6.569 | 100 |
| 6.268 | 36 |
| 5.864 | 23 |
| 5.655 | 16 |
| 4.826 | 27 |
| 4.522 | 14 |
| 4.358 | 20 |
| 4.056 | 89 |

TABLE B—Continued

| Interplanar spacing, $d(\text{Å})$: | Relative line intensity, $I/I_{max} \times 100$ |
|---|---|
| 3.776 | 57 |
| 3.718 | 80 |
| 3.574 | 23 |
| 3.482 | 20 |
| 3.377 | 20 |
| 3.347 | 41 |
| 3.139 | 41 |
| 3.051 | 20 |
| 2.991 | 61 |
| 2.827 | 25 |
| 2.763 | 59 |
| 2.668 | 30 |
| 2.452 | 32 |
| 2.178 | 25 |
| 1.81 | 23 |

The particular X-ray technique and/or apparatus employed, the humidity, the temperature, the orientation of the powder crystals and other variables, all of which are well known and understood by those skilled in the art of X-ray crystallography or diffraction, may cause some variation in the intensities and positions of the X-ray lines. Thus, the X-ray data given herein to identify zeolite N are not intended to exclude those materials which, due to some variable mentioned above or otherwise known to those skilled in the art, do not show all of the tabulated X-ray lines, or show additional ones permissible to the crystal system of the zeolite, or show a slight change in intensity, or a shift in position of some of the X-ray lines as set forth in Table A.

Zeolite N, prepared as hereinafter described, consists of fine grained (from about 5–10 microns) colorless crystals. The zeolite belongs to the cubic, face-centered system with $a=37.219$ Å. The unit cell volume is 51.557.8 cu. Å.

Zeolite N is readily prepared by digesting and crystallizing an aqueous sodium and tetramethylammonium aluminosilicate mixture whose overall composition, expressed in terms of mole ratios of oxides, preferably fall within the range of:

| | |
|---|---|
| $\dfrac{Na_2O+(Me4N)_2O}{SiO_2}$ | From about 0.9 to about 1.1. |
| $Na_2O/SiO_2$ | From about 0.4 to about 0.55. |
| $SiO_2/Al_2O_3$ | From about 1.9 to about 2.1. |
| $\dfrac{H_2O}{Na_2O+(Me4N)_2O}$ | From about 30 to about 50 |
| where $Me=CH_3$; | |

Representative reactants are silica gel, silicic acid, colloidal silica or sodium silicate as the source of silicon and activated alumina, gamma alumina, alumina trihydrate or sodium aluminate as the source of aluminum. Sodium hydroxide and tetramethylammonium hydroxide provide the required sodium and tetramethylammonium ions, respectively. Preferably the reactants are water soluble.

It has been surprisingly found that digestion and crystillization of the reaction system must be carried out under dynamic conditions as distinguished from the static conditions conventional in the preparation of other zeolitic molecular sieves. The reaction system which under dynamic conditions produces substantially pure zeolite N is capable of and does produce zeolite N–A (described in co-pending U.S. application Ser. No. 97,474, filed Mar. 22,1961, by Barrer et al. now U.S. Patent No. 3,306,922.) under static conditions. While the reasons for this change in crystallization are not fully understood, it is believed to be in some manner related to the reaction rate, the increased rate of reaction resulting from agitation of the system greatly favoring the formation of zeolite N over the formation of zeolite N–A.

By the term "dynamic conditions" as used herein and applied to the digestion step of the present process is meant that the aqueous reaction system is constantly being agitated so that during crystallization the reaction system remains homogeneous or uniform throughout. It is not necessary that the agitation be vigorous, however, since gentle shaking or stirring has been found to be entirely satisfactory. Since the degree of agitation depends on a wide variety of factors such as the nature of the reaction vessel, the quantity of reactant mixture involved, and the type of agitating apparatus used, no absolute limits can be set. Simple trial and error runs will enable one skilled in the art to establish an adequate degree of agitation for a particular system, i.e., substantial quantities of zeolite N–A in the zeolite product indicate that the degree of agitation should be increased.

The reaction system is formed by placing all the required reactants in the proportions hereinbefore defined in a reaction vessel provided with agitating means and bringing the temperature of the system thus formed to a temperature of between about 85° C. and about 105° C. An initial aging of the reaction system at ambient room temperatures with or without agitation can be utilized if desired, but no advantage has been found in such a step despite a contrary finding with many other zeolitic molecular sieves. In fact purer zeolite N products appear to result from the omission of the aging step. Agitation should be commenced, however at or very shortly after the time the reaction system is heated to the reaction temperature of 85° C. to 105° C. Reaction temperatures of from about 90° C. to about 100° C. are preferred.

After the reaction period, the zeolite crystals are filtered off. The reaction magma may be filtered, at the reaction temperature if desired but hot magmas are preferably cooled to room temperature before filtering. The filtrate, or mother liquor, may be reused after enrichment with the proper amounts of reactants to give a properly proportioned reactant mixture. The mass of zeolite crystals is washed (preferably with distilled water and conveniently on the filter) until the effluent wash water in equilibrium with the zeolite has a pH of between 9 and 12.

Thereafter, the crystals are dried, conveniently in a vented oven at a temperature of between about 25- C. and 150- C. For X-ray and chemical analysis, this drying is sufficient. In practical use, there need be no separate drying step since the zeolite will dry as it is activated.

In a more specific process embodiment, it has been found that the zeolites of this invention can be prepared by employing as a major part of the starting aqueous reactant mixture a calcined kaolin-type clay such as meta-kaolin.

Kaolin-type clays or clay minerals have the general molar composition $Al_2O_3 \cdot 2SiO_2 \cdot {}_{2-}4H_2O$, which makes such clays especially suited for the synthesis of the zeolite N compositions of this invention which have a molar $SiO_2/Al_2O_3$ ratio of about 2. Some kaolin-type minerals however have $SiO_2/Al_2O_3$ ratios from as low as about 1.8 to as high as about 2.3. These materials when calcined are also suitably utilized in the present process, or, if desired, the $SiO_2/Al_2O_3$ can be adjusted to a value closer to 2 by adding additional silica or alumina per se or by means of a suitable source thereof.

The data of Table C include analyses of several kaolin-type clays found to be suitable in the process of the invention when calcined. As may be seen, the mole ratio of $SiO_2/Al_2O_3$ in the examples varies, i.e. (1.9, 2.04 and 2.20) but within the preferred range of 1.8–2.3.

TABLE C.—ANALYSES OF TYPICAL KAOLIN-TYPE MATERIALS

| Oxide | Georgia kaolinite A | | Georgia kaolinite B | | North Carolina kaolinite C | | Utah halloysite | |
|---|---|---|---|---|---|---|---|---|
| | Percent by wt. | Moles | Percent by wt. | Moles | Percent by wt. | Moles | Percent by wt. | Moles |
| $Na_2O$ | 0.2 | | 0.40 | | 0.82 | | 0.1 | |
| $K_2O$ | <0.1 | | 0.43 | | | | | |
| $Al_2O_3$ | 40.2 | 1.0 | 37.20 | 1.00 | 37.2 | 1.0 | 37.3 | 1.00 |
| $SiO_2$ | 45.0 | 1.9 | 44.82 | 2.04 | 48.2 | 2.20 | 41.6 | 1.89 |
| Ign. loss (as $H_2O$) | 9.4 | 1.33 | 14.68 | 2.23 | 13.1 | 1.99 | 20.0 | 3.04 |
| $TiO_2$ | 2.5 | | 1.26 | | | | | |
| Other | 1.4 | | 1.31 | | 0.78 | | | |
| | 98.8 | | 100.1 | | 100.1 | | 98.9 | |

The kaolin-type or two-layer clays hereinafter mentioned are one of the major classes of clay materials or minerals which can be calcined and used as a starting material of the present process. They may be considered as sheetlike crystalline silicates. Their basic structural unit is an aluminosilicate sheet consisting of a layer of silicon cations in tetrahedral co-ordination with oxygen anions, bonded to a layer of aluminum cations in octahedral co-ordination with oxygen or hydroxyl anions. These sheets are stacked one on top of another to form the small plate-like crystals of the mineral. Representative of the clay minerals which contain this two-layer sheet and which may be used in the process of this invention are: kaolinite, levisite, nacrite, dickite, endellite and halloysite. They differ only in the way that the basic structural sheets are stacked. Pure kaolinite,

$$Al_2O_3 \cdot 2SiO_2 \cdot 2H_2O$$

has the composition by weight $Al_2O_3 = 39.56\%$.
$SiO_2 = 46.54\%$.
$H_2O$ (combined) $= 13.90\%$.

Kaolin-type clays or clay minerals when suitably treated appear to undergo several transitions, although the exact natures of the products of such transitions are not clearly known nor are the mechanisms of the behavior during heating completely understood. There is in fact considerable speculation and disagreement in the literature concerning this problem. When kaolin-containing clays are heated in air, the first of these transitions is observed to begin at about 550° C.–600° C., where the crystalline silicate sheets are apparently destroyed or at least altered or disordered to yield a product which is essentially amorphous to X-rays. By "amorphous to X-rays" is meant that the X-ray spectrometer trace exhibits substantially no sharp diffraction bands and is similar to that obtained for a glass. This transition product or metastable phase is sometimes referred to as "metakaolin," "metakaolinite," "dehydrated kaolin," or "dehydroxylated kaolinite." Roy et al. [Jour. Amer. Ceram. Soc., 38, 205 (1955)] have defined "metakaolinite" as "a metastable high-free-energy phase in the range 600° C. to 900° C."

When the clay material is to be converted to "reactive kaolin" by a thermal treatment, the temperatures and times at which the conversion is best carried out are interdependent. For instance, a minor degree of conversion will take place at temperatures at, and slightly below 575° C.; that is on a percentage basis, there will be some reactive kaolin in any batch being treated. Above 600° and preferably between 600° C. and 850° C. total conversion might be expected if the firing conditions are maintained for a sufficient length of time. From the following discussion it will be clear that a higher firing temperature lessens the time required, and conversely at the minimum temperature of about 600° C., a considerably greater period will be required to bring about a suitable degree of conversion. At temperatures exceeding about 850° C. the conversion process leads to material that when employed to produce a given zeolite also yields impurity products that impair the molecular sieving property of the desired zeolite.

The time interval during which the kaolin-containing mineral should be held at 600°–850° C. in the firing step must also be controlled if substantial quantities of crystalline molecular sieve zeolite are to be produced in the subsequent steps of the process of the invention.

It has been determined that a firing temperature of 600° C. from about 45 to 60 minutes are required to produce substantial quantities of crystalline zeolite; although some alterations of the original kaolin structure was found to have occurred after a ten-minute firing at 600° C., digestion of this fired material showed that it was not sufficiently reactive to produce more than minor amounts of crystalline zeolite. At firing temperatures of about 600° C. to 700° C., therefore, the firing time may be about one hour or more; in the region of about 700° C. to 800° C., firing time of as low as 10–15 minutes have been used with satisfactory results when relatively thin beds of charge material on the order of ¼–¾ inch in depth are used. However at 700° C.–800° C. at least about one hour is usually preferred to insure thorough treatment of the charge.

In order that the reactive kaolin be easily suspended in and uniformly utilized at high rates of reaction in the process of this invention, it is preferred that it be in powdered form of (average) equivalent spherical diameter less than about 50 microns size, down to about 0.2 micron. Powder sizes up to about 200 mesh may be employed with, however, some disadvantage in these regards.

Kaolin clays can also be transformed into a suitably reactive state by prolonged intensive mechanical attrition such as ball milling. As with calcined kaolin, the kaolin treated in this manner is substantially amorphous to X-rays. Accordingly the phrase "reactive kaolin-type mineral substantially amorphous to X-rays" is intended to embody clays treated either thermally or mechanically.

After having undergone a suitable firing or other conversion treatment, the activated clay can be incorporated into a reaction system such as defined hereinbefore. The clay can provide all or any part of the required silica and/or alumina in the reaction mixture. In those cases where the particular kaolin-type clay is slightly low or high in silica for the desired reaction mixture, sources of additional silica or alumina such as silica gel or aluminum trihydrate can be employed to achieve the desired reactant proportions.

For use as an adsorbent, zeolite N is activated by heating the crystals at temperatures of from about 200° C. to about 700° C. At temperatures of about 900° C. and above the crystalline structure is destroyed and a β-cristobalite phase results. Activation can be accomplished by heating either in air at atmospheric pressure or under reduced pressure. In general, reduced pressure permits the use of lower temperatures of activation. When a sample of zeolite N was heated for about 15 hours at 400° C. in air about 16.3 percent of its original weight was lost due to removal of water of hydration. When placed in a hydrator for 3 days the zeolite was found to adsorb 15.6 weight percent (anhydrous basis) water.

Zeolite N, after activation in vacuum (<0.005 mm. Hg) at 350° C., was found to adsorb 4.3 weight percent water in 6 hours, and 16.0 weight percent in 4 days, at 18 mm. Hg pressure and 25° C. The zeolite did not adsorb oxygen or nitrogen at −183° C. and −196° C., respectively.

Zeolite N is therefore useful as a desiccant for oxygen and nitrogen gas streams.

Using aqueous calcium chloride and silver nitrate solutions, respectively, exchange of the sodium cation content of zeolite N for calcium and silver cations was attempted. After treatment for 16 hours at 100° C. the molar compositions of the products were found to be:

$$0.12Na_2O:0.78CaO:0.03(Me_4N)_2O:Al_2O_3:2SiO_2$$

and $$0.87Ag_2O:0.03(Me_4N)_2O:Al_2O_3:2SiO_2$$

After heating at 350° C. in vacuum to activate the silver and calcium forms, it was found that these forms are unstable and do not adsorb.

The following examples are illustrative of the methods of preparation of zeolite N.

EXAMPLE I

A good commercial grade of raw kaolin was heated in air for 16 hours at 700° C. The resulting metakaolin product was found to be amorphous to X-rays except for a small amount of titania impurity. Five grams of this metakaolin were placed in a reaction vessel also containing 1.40 grams of sodium hydroxide, 9.53 grams of tetramethylammonium hydroxide pentahydrate and 26.04 grams of water. The overall composition of the reactant mixture, expressed in mole-oxide-ratios, was as follows:

$$\frac{[Na_2O + [(CH_3)_4N]_2O]}{SiO_2} \quad 1.0$$

$$Na_2O/SiO_2 \quad 0.4$$

$$SiO_2/Al_2O_3 \quad 2.0$$

$$\frac{H_2O}{[Na_2O + [(CH_3)_4N]_2O]} \quad 40$$

The composition was agitated at ambient temperature (~23° C.) for about 24 hours on a laboratory shaker. Thereafter the aged composition was heated to approximately 100° C. with mild shaking for 2 hours, quenched by the addition of cold water, and immediately filtered. The solids were washed with distilled water until the pH of the washings was less than 10. X-ray analysis identified the product as zeolite N with traces of zeolite A. The molar composition of the zeolite N was determined to be:

$$0.83\ Na_2O:0.04(Me_4N)_2O:Al_2O_3:2.07\ SiO_2:2.86\ H_2O,$$

where Me=CH₃—.

EXAMPLE II

Using metakaolin prepared as in Example I, a reaction mixture was prepared in the following proportions:

|  | Grams |
|---|---|
| Metakaolin | 5.0 |
| NaOH | 1.74 |
| Me₄NOH·5H₂O | 7.86 |
| H₂O | 26.88 |

In terms of mole-oxide-ratios the overall composition of the mixture was $$\frac{Na_2O+(Me_4N)_2O}{SiO_2} \quad 1.0$$

$$Na_2O/SiO_2 \quad 0.5$$

$$SiO_2/Al_2O_3 \quad 2.0$$

$$\frac{H_2O}{Na_2O+(Me_4N)_2O} \quad 40$$

The reaction mixture was digested at 95° C. with moderate shaking for 6 hours without employing an ambient temperature aging period. After isolation and washing, the zeolite crystals were determined to be substantially 100% zeolite N having a molar composition:

$$0.83\ Na_2O:0.02(Me_4N)_2O:Al_2O_3:1.89\ SiO_2:2.71\ H_2O$$

The X-ray diffraction pattern is that set forth in Table B supra.

What is claimed is:

1. A crystalline synthetic zeolitic molecular sieve having a composition expressed in terms of moles of oxides as follows:

$$0.83 \pm 0.05\ Na_2O:0.003 \pm 0.01[(CH_3)_4N_2]O:Al_2O_3:2.0 \pm 0.2\ SiO_2:yH_2O$$

wherein y is any value up to about 3 and having an X-ray powder diffraction pattern essentially as set forth in Table A.

2. Process for preparing the zeolite molecular sieve of claim 1 which comprises preparing an aqueous reaction system whose composition expressed in terms of oxide-mole ratios is within the range:

| | |
|---|---|
| $\frac{Na_2O+[(CH_3)_4N]_2O}{SiO_2}$ | Of from about 0.9 to about 1.1. |
| $Na_2O/SiO_2$ | Of from about 0.35 to about 0.55. |
| $SiO_2/Al_3O_3$ | Of from about 1.9 to about 2.1. |
| $\frac{H_2O}{Na_2O+[(CH_3)_4N]_2O}$ | Of from about 30 to about 50. | agitating and maintaining said reaction mixture at a temperature between about 85° C. and 105° C. until crystals of said zeolitic molecular sieve form, and separating the crystals from the mother liquor.

3. Process according to claim 2 wherein the major proportion of the source of silica and alumina is kaolin in a form amorphous to X-rays.

4. Process according to claim 3 wherein the kaolin is amorphous to X-rays by virtue of being calcined at temperatures between about 600° C. and about 850° C.

References Cited

UNITED STATES PATENTS

| | | |
|---|---|---|
| 2,882,243 | 4/1959 | Milton. |
| 2,882,244 | 4/1959 | Milton _____ 23—113 XR |
| 3,008,803 | 11/1961 | Milton _____ 23—113 |
| 3,071,434 | 1/1963 | Frilette et al. _____ 23—113 |
| 3,114,603 | 12/1963 | Howell _____ 23—113 |
| 3,306,922 | 2/1967 | Barrer _____ 260—448 |
| 3,314,752 | 4/1967 | Kerr _____ 260—448 |

TOBIAS E. LEVOW, Primary Examiner.

H. M. S. SNEED, Assistant Examiner.